United States Patent [19]

Born et al.

[11] Patent Number: 4,849,639

[45] Date of Patent: Jul. 18, 1989

[54] LUMINESCENT CERAMIC PLATES

[75] Inventors: Peter J. Born, Ledbury; Daniel S. Robertson; Ian M. Young, both of Malvern, all of England

[73] Assignee: The Secretary of State for Defence in Her Britanic Majesty's Government of the United Kingdom of Great Britain and Northern Ireland, Whitehall, England

[21] Appl. No.: 900,098

[22] PCT Filed: Dec. 12, 1985

[86] PCT No.: PCT/GB85/00581

§ 371 Date: Aug. 19, 1986

§ 102(e) Date: Aug. 19, 1986

[87] PCT Pub. No.: WO86/03768

PCT Pub. Date: Jul. 3, 1986

[30] Foreign Application Priority Data

Dec. 17, 1984 [GB] United Kingdom ............... 8431838

[51] Int. Cl.$^4$ .............................................. H01J 29/22
[52] U.S. Cl. .............................. 250/483.1; 250/484.1; 264/56
[58] Field of Search ........................ 250/484.1, 483.1; 264/65, 56

[56] References Cited

U.S. PATENT DOCUMENTS

| 2,124,224 | 7/1938 | Batchelor | 250/483.1 |
| 2,125,599 | 8/1938 | Batchelor | 250/483.1 |
| 2,965,784 | 12/1960 | Hoffman | 250/483.1 |
| 3,790,783 | 2/1974 | Brunskill et al. | 250/483.1 |
| 3,927,328 | 12/1975 | Kawabata et al. | 250/484.1 |
| 4,129,519 | 12/1978 | Matsuzawa | 250/484.1 |
| 4,340,839 | 7/1982 | Fujita et al. | 313/466 |
| 4,421,671 | 12/1983 | Cusano et al. | 250/483.1 |
| 4,678,761 | 7/1987 | Virkar et al. | 264/65 |

FOREIGN PATENT DOCUMENTS

| 2747509 | 4/1979 | Fed. Rep. of Germany . |
| 3108164 | 2/1982 | Fed. Rep. of Germany . |
| 1249334 | 11/1960 | France . |
| 2040979 | 9/1980 | United Kingdom . |
| 2094823 | 9/1982 | United Kingdom . |
| 2136195A | 9/1984 | United Kingdom . |

OTHER PUBLICATIONS

Dabney, "Ferrite Quality Control and Evaluation", Ceramics, Dec., 1969, based on lecture at North Staffordshire College of Technology, pp. 10–17.

Pinnow et al., "Photoluminescence Conversion of Laser Light for Black and White and Multicolor Displays, 2: Systems," Jan. 1971, Applied Optics, vol. 10, No. 1, pp. 154–160.

Primary Examiner—Janice A. Howell
Assistant Examiner—William F. Rauchholz
Attorney, Agent, or Firm—Nixon & Vanderhye

[57] ABSTRACT

A ceramic plate capable of luminescing under electron X-ray or other ionizing radiation comprises a fine powder bound in water glass such as sodium or potassium hydroxy silicates, or sodium or potassium borates. The powder is typically less than 50 μm mean particle size e.g. 10 μm size. Powder material includes: calcium borate, yttrium aluminate, zinc yttrium silicate, calcium silicate, germanate, Magnesium borate, Barium borate, strontium borate. Dopant materials may be Tb, Tm, Ce, Eu, Pr, Yb, Mn, Cu, Ag, Pb added in amounts up to 15% weight or more. The plate is formed by mixing powder and water glass into a dough. The dough is pressed in a mould to remove excess water glass and fired at about 950° C. for about 8 hours. Alternatively excess water is used when mixing powder and water glass. This excess water is allowed to evaporate while the plate is in a mould prior to pressing and firing. The plate may be used as a cathode ray tube face plate, the detector in an X-ray thermoluminescent system, or an X-ray scintillator.

12 Claims, 2 Drawing Sheets

LUMINESCENT CERAMIC PLATES

TECHNICAL FIELD

This invention relates to luminescent ceramic plates capable of luminescing when irradiated by electrons, X-rays, ultra-violet rays or γ-rays. Such plates are useful as cathode ray tube (C.R.T.) face plates, thermoluminescent plates, or scintillators.

BACKGROUND ART

Face plates for cathode ray tubes are usually a layer of a phosphor powder in a binder settled onto a glass plate. Electrons strike the phosphor layer resulting in emission of light. A disadvantage of these powder layers is their susceptibility to damage when high energy electron beams are used to obtain high light outputs. In addition under the latter conditions the glass face plate can be damaged.

Attempts at overcoming this disadvantage include the use of a thin single crystalline film grown onto the surface of the glass. This gives increased burn resistance but produces multiple reflections within the film and hence poor performance.

Another way of employing a phosphor layer is described in G.B. Pat. No. 2,094,823 B and G.B. Pat. Application No. 2136195A. In the former a dried powder layer is fired at 1,350° C. for 8 hours to give a ceramic layer. In the latter specification powdered phosphor is held under pressure, e.g. 15 hectobar, in a mould whilst heated to 1,350° C. The resultant ceramic can be cut and polished and used as a cathode ray tube face plate.

Thermoluminescent plates may be used in radiology apparatus. This is described for example in G.B. Patent Application No. 83 27883, now abandoned. A plate of thermoluminescent material is exposed to an X-ray pattern in the same manner as X-ray photographic film. The plate is heated and radiates visible light corresponding to the X-ray pattern. This visible light is of low intensity and needs to be detected by a sensitive detector such as a photomultiplier. Subsequent heating clears the pattern and the plate can then be reused.

Various detector materials can be used. For example single crystal materials such as lithium tetraborate, and doped with copper or manganese, etc.; or recrystallized glass. The detector plate can be a single large plate or a mosaic of smaller plates. In all cases the cost of a detector plate is high. Also it is difficult to produce a plate sensitive enough by the above processes.

Scintillators are used in various systems to provide detection of X-rays. For example a sheet of scintillator material can be used as a backing for X-ray film to enhance the image formed on the film on exposure to an X-ray pattern.

The invention provides luminescent plates capable of production in quite large sizes e.g. up to 50×50 cms at relatively low cost.

DISCLOSURE OF INVENTION

According to this invention a luminescent plate comprises a powdered material bonded with non-volatile water glass preferably or any other low melting point glass and formed into a ceramic.

The powder material may be selected from:
calcium borate e.g. $CaB_2O_4$, $Ca_2B_2O_5$, $Ca_3B_2O_6$
yttrium aluminate (YAG)
zinc yttrium silicate (ZYS)
calcium silicate $CaSiO_3$, $Ca_2SiO_4$
calcium germanate e.g. $CaGe_2O_5$, $CaGe_4O_9$
magnesium borate $MgB_2O_4$, $Mg_2B_2O_5$, $Mg_3B_2O_6$
barium borate $BaB_2O_4$, $BaB_4O_7$, $BaB_8O_{13}$
strontium borate $SrB_2O_4$, $SrB_4O_7$, $Sr_2B_2O_5$, $Sr_3B_2O_6$.

Activators for the powders may be ions of rare earth elements such as Tb, Tm, Ce, Eu, Pr, Yb, Gd, or the ions of Mn, Cu, Ag, Pb and may be added by up to 15% by weight.

The non-volatile water glass may be sodium or potassium hydroxy silicate, or sodium or potassium borates.

According to this invention a method of producing luminescent plates comprises the steps of:
 (i)-preparing a fine powder of material;
 (ii)-mixing a quantity of the powder with a quantity of non-volatile water glass to give a dough;
 (iii)-pressing the dough in a shaped mould under a pressure and for a time sufficient to remove excess water glass;
 (iv)-firing the shaped dough at a temperature below the melting point of the powder for a time until a ceramic plate is formed.

The powder is preferably less than 50 μm particle size.

For step (i) the activators may be added as an oxide to the other components and milled together. Following milling the mixture may be heated in air for 8 hours or longer at 1,000° C. or more. The final mixture may then be milled to reduce the mean particle size to less than 50 μm.

After step (iv) the plate may be ground, and polished, to the required shape, and finish, flat or curved.

The pressure applied to the dough is typically between 8–10 kg cm$^{-2}$ (100 and 150 lb/inch$^2$) applied for 4 to 24 hours. The firing temperature is typically above 950° C. e.g. 950° to 1,150° C. held for around eight hours.

Alternatively, after step (ii) the dough is allowed to dry before being pressed as in step (iii). In this case the water glass is diluted with water prior to step (ii). Different moulds may be used for drying and pressing.

BRIEF DESCRIPTION OF DRAWINGS

Embodiments of the invention will now be described by way of example only with reference to the accompanying drawings of which.

DETAILED DESCRIPTION OF INVENTION

The plates may be prepared as follows:

EXAMPLE 1

1. Material to be bonded, eg. calcium borate doped with 5% by weight of Tb, was ground into a fine powder. Typically the powder size was less than 50 μm, e.g. 10 μm.

2. Powder was slowly added to sodium silicate solution in the ratio 100 gms powder to 40 mls solution. The mixture was stirred until a malleable dough was obtained.

3. The dough was transferred to a mould and subjected to a pressure of between 8-10 kg cm$^{-2}$. This pressure was maintained between 4 and 24 hours. During this time about 80% of the silicate solution was pressed out from the dough.

4. The pressed material is in the form of a hard easily handled article when removed from the press.

5. The shaped article was then fired at a temperature above 950° C. but less than the powder-water glass mixture melting point, depending on the ceramic being formed.

6. The fired article is found to be a hard ceramic impervious to moisture that could be ground and polished to its final shape.

EXAMPLE 2

1. Material to be bonded, e.g. calcium borate doped with 5% by weight of Tb, was ground into a fine powder. Typically the powder size was less than 50 μm, e.g. 10 μm.

2. 100 gram of powder was added to a solution of 40 mls sodium silicate $Na_2O_2SiO_2$ 50%:$H_2O$ 50% approximately) in 200 mls of water. The mixture was stirred until a uniform mixture was obtained.

3. The mixture was transferred to a plastic (impervious), or plaster (pervious) mould and allowed to dry until the weight attained 270 gms.

4. The partly dried plate was transferred to a metal mould and subjected to a pressure of between 8-10 kg cm$^{-2}$. This pressure was maintained between 4 and 24 hours. During this time about 80% of the silicate solution was pressed out from the dough.

5. The pressed material is in the form of a hard easily handled article when removed from the press.

6. The shaped article was then fired at a temperature above 950° C. but less than the powder-water glass mixture melting point, depending on the ceramic being formed.

7. The fired article is found to be a hard ceramic impervious to moisture that could be ground and polished to its final shape.

Figure 1:
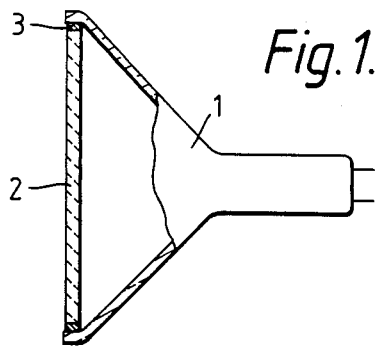
FIG. 1 is a part sectional view of a cathode ray tube having a ceramic face plate.

FIG. 1 shows a partly sectional view of a cathode ray tube (C.R.T.) comprising an evacuated glass envelope 1 and a ceramic face plate 2. This face plate 2 is typically 2 mm thick and is fixed to the glass by a malleable silver chloride sealant 3 melted into place.

Inside the envelope 1 are conventional anode and cathode structures, not shown.

The face plate 2 is prepared as described earlier. The powder material may be:

YAG Tb doped, to give green, Eu to give red and Ce to give blue emission;

ZYS Tb doped to give green, Eu doped to give red, Ce to give blue emission; or calcium silicate Tb doped to give green, Eu to give red and Ce to give blue emission.

Multi-color operation may be achieved by forming a face plate of undoped material and selectively implanting dopants e.g. by ion implantation. This doping can be done in different areas or to different depths (penetron operation).

The cathode ray tube 2 may be used in head-up displays (HUD) or other high brightness displays. Being a ceramic material the face plate 2 can withstand high electron beam currents without burning.

Figure 2:
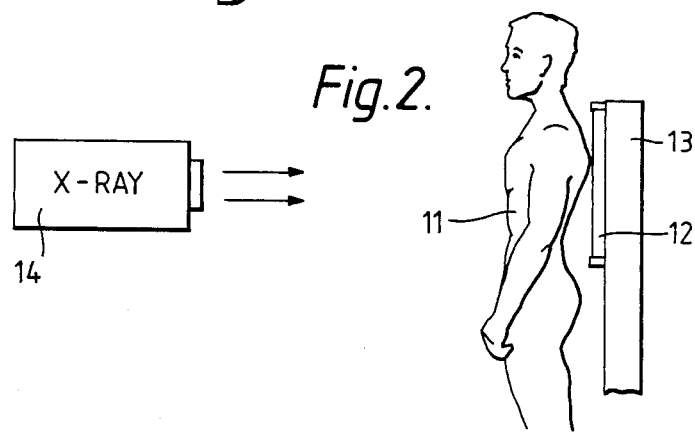
FIG. 2 is a side view of a patient having a chest X-ray, with a thermoluminescent detector plate.
Figure 3:
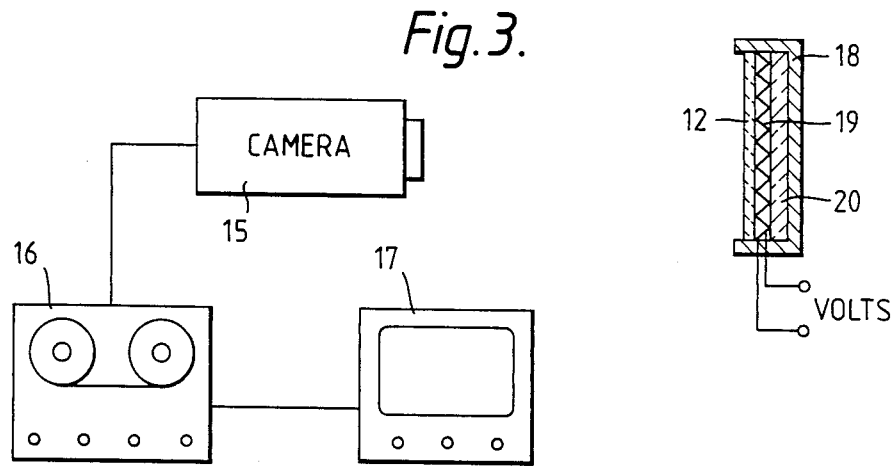
FIG. 3 is a side view of apparatus for heating the detector plate and recording the resultant image.

Another use of ceramic plates is in radiology to replace the conventional X-ray films. This is shown in FIGS. 2, 3, 4.

As shown a patient 11 stands in front of a detector plate 12 mounted on a support 13. An x-ray source 14 is arranged to irradiate the required parts of the patient 11 in a known manner. A typical chest X-ray dose is 1 rad. giving 20 to 50 millirad. at the plate. On irradiation the plate 12 is selectively ionized in a pattern corresponding to the selective absorption of the patient's body. Such a pattern remains intact for many days until destroyed or cleared by appropriate heating.

The ionization pattern is not visible without heating of the plate 12. The amount of light given off depends upon the amount of X-ray absorption by the plate and the temperature to which it is heated.

Figure 4:
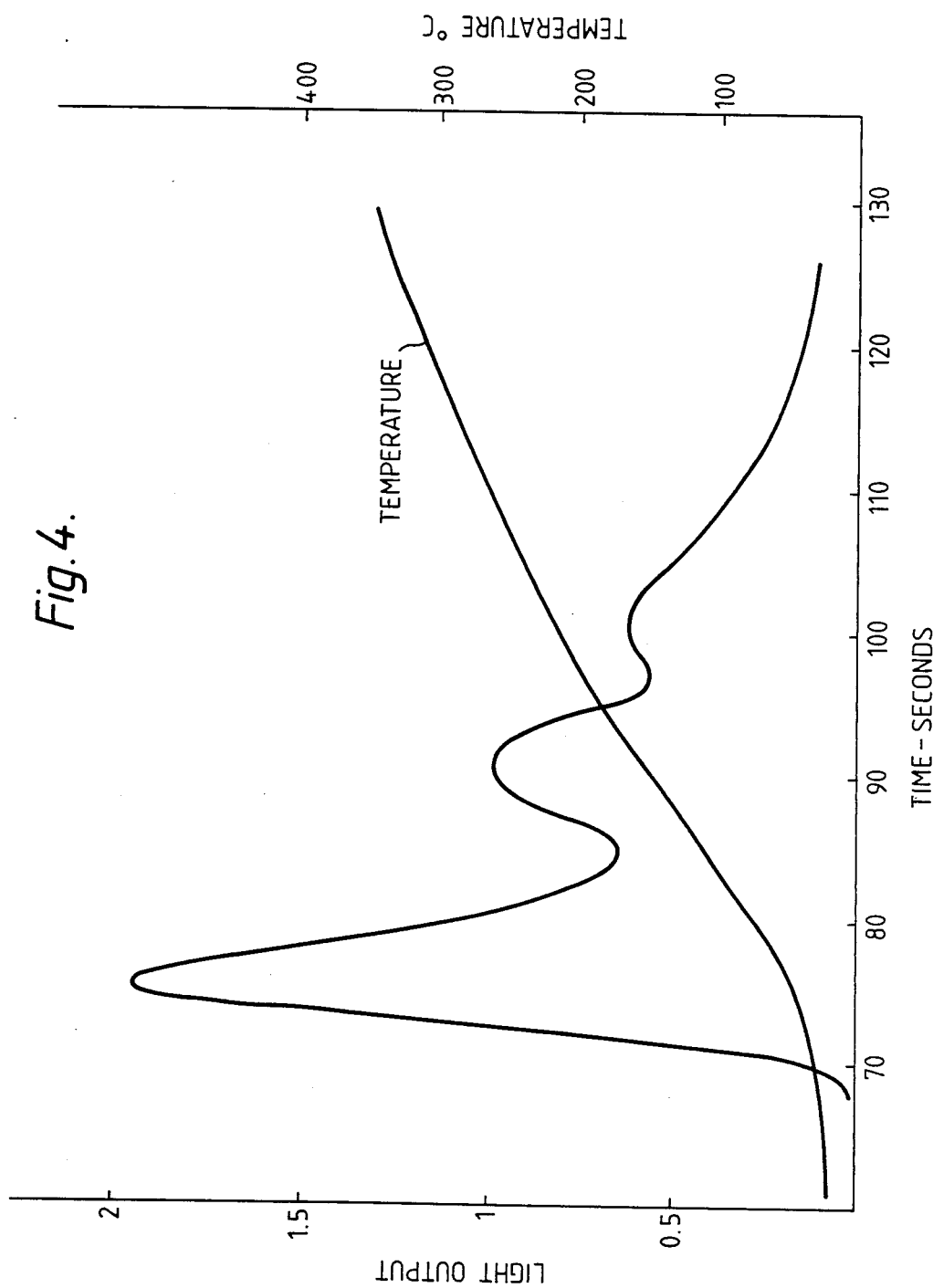
FIG. 4 is a graph showing light output of the detector plate in FIG. 2.

FIG. 4 shows a graph of light output. The phosphor material is calcium borate doped with 10% by weight Tb. To obtain the curves shown the plate was heated as indicated by the temperature/time graph. Light output was measured by a photomultiplier detector and expressed as counts per second$\times 10^{-3}$/m.g. of detector material exposed/K.rad of radiation. Light emissions peak at plate temperature of about 45° C., 150° C. and 215° C.

For medical applications low x-ray dosages are needed. This results in low light output from the plate 12. It is therefore usually necessary to employ very sensitive light detectors 15 that are scanned over the exposed plate 12. The detector 15 output is stored e.g. on tape 16 for display e.g. on a cathode ray tube 17.

FIG. 3 shows one way of reading the ionization pattern in the plate.

The plate 12 is retained by in a holder 18 with an electrical resistance heating tape 19 held against the rear surface. Thermal insulation 20 backs the heater.

A second method of heating is point by point or line by line heating using heat supplied by (a) a laser, carbon dioxide pulsed or continuous operation;

(b) a heating stylus consisting of a microject of heated air or a conductively heated roller ball.

A low light television camera 15 images the heated plate and sends an output to a monitor cathode ray tube 17 and recorder 16.

Alternatively a photomultiplier or image intensifier unit may be used, scanned over a heated plate point by point. This scanning may be achieved by movement of the photomultiplier itself or associated fibre optic light pipes attached, or by x, y translation of the plate. For large plates an array of photo multipliers, arranged e.g. in a line, is traversed over the plate. This reduces the read time.

Another method of scanning involves a row of silicon diodes arranged at a pitch of about 100 μm or more. These detect the light emission through a fibre optic manifold which thermally isolates the plate and diodes. A mask having a 250 μm slit is moved over a heated plate. The diodes are positioned just above the slit, and read a line of information at a time as the slit moves down the plate.

A further method of scanning is line scan, where the image from a single line is viewed by a rotating 45° mirror situated above the plate. This image is then transferred to the photomultiplier mounted in line with the mirror. This has the advantage of requiring only the plate to be moved and in one direction only.

A further use of ceramic plates is for scintillator application. In these applications the scintillator acts as a detector of X-rays, gamma rays, etc. by luminescing when irradiated. The light given off is proportional to the dose received.

Figure 5:
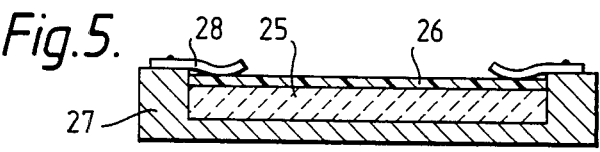
FIG. 5 is a sectional view of an x-ray cassette having a scintillator for enhancing X-ray film images.

One use of scintillators is to reinforce the visible image obtained on X-ray films in a cassette. This is shown in FIG. 5. A scintillator place 25 forms a backing for an X-ray film 26, both supported by a holder 27. Clips 28 hold the film 26 in place. The film 26 is sensitive to both X-rays and blue light. On exposure to X-rays, e.g. as in FIG. 2, some of the X-rays passing through a patient 11 are absorbed in the film 26; others pass into the scintillator plate 25. This causes blue light emission from the scintillator 25 which is absorbed by the film 26. As a result the X-ray pattern image subsequently developed in the film 26 is enhanced. A suitable scintillator is calcium borate or silicate containing Ce ions.

Alternatively the plate 25 may be used both as a scintillator and a thermoluminescent plate. One suitable material is calcium silicate doped with e.g. 0.5% Yb. An x-ray exposure is taken as above with the plate scintillating and reinforcing the exposure of the x-ray film 26. This film is developed to provide an image quickly. The plate 25 is subsequently heated as described above and the thermoluminescent image obtained by a scanned detector. This detector output is stored for a permanent record of the X-ray exposure.

We claim:

1. A luminescent, three-dimensional, self-supporting, glass bonded ceramic plate composed of a finely powdered luminescent material compressed together in a non-volatile water glass matrix produced by preparing a fine powder of luminescent material, mixing a quantity of the fine powder with a quantity of water glass to give a dough, pressing the dough in a shaped mold under a pressure and for a time sufficient to remove excess water glass to produce a compressed shaped dough, and firing the compressed shaped dough at a temperature of at least 950° C. but below the melting point of the powder for a sufficient time until a ceramic plate is formed.

2. The plate of claim 1 wherein the powdered material is a material selected from the group consisting of
   calcium borate $CaB_2O_4$, $Ca_2B_2O_5$, $Ca_3B_2O_6$;
   yttrium aluminate (YAG);
   zinc yttrium silicate (ZYS);
   calcium silicate $CaSiO_3$, $Ca_2SiO_4$;
   calcium germanate $CaGe_2O_5$, $CaGe_4O_9$, $CaGeO_3$;
   Magnesium borate $MgB_2O_4$, $Mg_2B_2O_5$, $Mg_3B_2O_6$;
   Barium borate $BaB_2O_4$, $BaB_4O_7$, $BaB_8O_{13}$; and
   Strontium borate $SrB_2O_4$, $SrB_4O_7$, $Sr_2B_2O_5$, $Sr_3B_2O_6$.

3. The plate of claim 2 wherein the powdered material is doped with an activator material selected from the group consisting of Tb, Tm, Ce, Eu, Pr, Yb, Mn, Cu, Nd, Ag, and Pb.

4. The plate of claim 1 in the shape of a face plate of a cathode ray tube.

5. The plate of claim 1, in the shape of a thermoluminescent plate.

6. The plate of claim 1, in the shape of an X-ray scintillator.

7. A method of making a luminescent ceramic plate composed of a finely powdered luminescent material compressed together in a non-volatile water glass matrix and formed into the shape of a three-dimensional, self-supporting ceramic plate, the method comprising the steps of:

(i)-preparing a fine powder of luminescent material;
   (ii)-mixing a quantity of the fine powder with a quantity of water glass to give a dough;
   (iii)-pressing the dough in a shaped mold under a pressure and for a time sufficient to remove excess water glass to form a compressed shaped dough;
   (iv)-firing the compressed shaped dough at a temperature of at least 950° C. but below the melting point of the powder for a sufficient time until a ceramic plate is formed.

8. The method of claim 7 wherein an excess of water is used in step (ii) and the resultant mixture is allowed to partly dry while in a mould prior to step (iii).

9. The method of claim 7 wherein step (iii) utilizes a pressure of above 8 Kgms $cm^{-2}$ for a time of 4 to 24 hours.

10. The method of claim 7 wherein the shaped dough is fired in step (iv) for a time above 4 hours.

11. The method of claim 7 wherein prior to step (i) a dopant is mixed and milled with the luminescent material, fired, and then milled again until the mean particle size is less than 50 $\mu$m.

12. The method of claim 7 wherein after step (iv) the plate is ground to its final shape and surface finish.

* * * * *